(12) United States Patent
Jawurek et al.

(10) Patent No.: US 6,251,273 B1
(45) Date of Patent: Jun. 26, 2001

(54) FILTER

(75) Inventors: Heinz Jawurek, Neudenau; Erich Poldner, Steinheim; Heinz Wendt, Ludwigsburg, all of (DE)

(73) Assignee: Filterwerk Mann & Hummel GmbH, Ludwigsburg (DE)

(*) Notice: Subject to any disclaimer, the term of this patent is extended or adjusted under 35 U.S.C. 154(b) by 0 days.

(21) Appl. No.: 09/367,912

(22) PCT Filed: Jan. 14, 1998

(86) PCT No.: PCT/EP98/00172

§ 371 Date: Dec. 3, 1999

§ 102(e) Date: Dec. 3, 1999

(87) PCT Pub. No.: WO98/36818

PCT Pub. Date: Aug. 27, 1998

(30) Foreign Application Priority Data

Feb. 22, 1997 (DE) ................................. 197 07 132

(51) Int. Cl.[7] .................................................. B01D 35/30
(52) U.S. Cl. .......................... 210/232; 210/440; 210/454
(58) Field of Search ..................................... 210/238, 440, 210/454, 470, 232

(56) References Cited

U.S. PATENT DOCUMENTS

| 5,538,626 | * | 7/1996 | Baumann .............................. 210/130 |
| 5,698,097 | * | 12/1997 | Gebert et al. ........................ 210/454 |
| 5,770,065 | * | 6/1998 | Popoff et al. ........................ 210/454 |

FOREIGN PATENT DOCUMENTS

| 9312856 | * | 10/1993 | (DE) . |
| 19527844 | * | 7/1997 | (DE) . |
| 319518 | * | 10/1993 | (EP) . |

* cited by examiner

Primary Examiner—Matthew O. Savage
(74) Attorney, Agent, or Firm—Evenson, McKeown, Edwards & Lenahan, P.L.L.C.

(57) ABSTRACT

A filter comprising a housing, which consists of at least two housing parts, and a filter element attached inside the housing. The invention provides for at least one latch element by means of which a detachable latched connection can be established between the filter element and at least one of the housing parts.

4 Claims, 7 Drawing Sheets

FILTER

The invention relates to a filter and a filter element.

Such filters and filter elements are disclosed, for example, in DE GM 296 16 834 in which a filter insert is shown whose ends are joined sealingly to end plates, wherein one or both end plates have an opening, in the marginal area of which an annular gasket is placed, which when the filter insert is in the installed state cooperates with a portion of the filter housing, and wherein at least one of the end plates is configured with a collar-like extraction handle which is spaced axially outward from the plane of the end plate and has an outside diameter smaller than the outside diameter of the end plate.

Also known from EP A1 0711 587 is a filter insert of this kind in which a collar-like elevation is likewise shown on one of the end faces of the filter insert, by means of which it is possible to remove the filter insert from the housing.

Furthermore, DE-OS 43 33 151 discloses a locking mechanism near the tip for a typewriter, in which three sleeve parts—a centering sleeve, a handle sleeve and an inner sleeve—are nested one inside the other, while a front pivot bearing is provided which resides between the handle sleeve and the centering sleeve, and forms a rotating latch and release mechanism between the rear end portion of the centering sleeve and the axially fixed and non-rotatable inner sleeve, the handle sleeve being axially displaceable on the outside of the inner sleeve.

If it is desired to use such filters or filter elements so that they are removable from the housing without coming in direct contact with the filter element, it is a disadvantage that the handle elements, which are collar-like, are attached directly to the filter element, so that direct contact with the filter element is unavoidable. An additional device could be provided which clutches the filter element tong-wise in the area of the collar-like shape. This has the disadvantage, however, that an additional cost-involving device must be created in order to avoid direct contact with the filter element.

The invention is thus addressed to the problem of improving a device of the kind described above so that a filter and filter element will result which makes it easier to install and remove a filter element that can still operate securely, without coming in direct contact with the filter element.

The problem is solved according to the invention by a filter which comprises a housing consisting of at least two housing parts, and a filter element fastened in the housing; at least one latch means is provided whereby a releasable latch fastening can be produced between the filter element and at least one of the housing parts. The advantage of such a solution is that a filter cartridge can be inserted into and removed from a filter housing in which the cartridge is fastened positively to a housing part without coming directly in contact with the cartridge which is possibly contaminated after use.

An advantageous embodiment of the invention provides that at least one latch means engages at least one corresponding opening and becomes hooked therein in the manner of a bayonet. This has the advantage that definite locations are created at which a detent, for example, can enter into a reliable and yet releasable connection.

In another advantageous embodiment, at least one latch means is disposed on the filter element. The latch means provided on the filter element resiliently engages in a corresponding recess on the housing in order to produce a releasable snap fastening.

Also, provision can be made according to the invention for at least one latch means to be provided on at least one housing part. As a reversal of the action, the placement of the latch means on the housing is also possible.

In an advantageous embodiment of the invention, at least one corresponding recess is provided on at least one housing part. These recesses provide the assurance that the engagement and disengagement will definitely take place, especially disengagement when the filter element is to be removed from the housing. In this case an axial movement of the filter element is provided for, whereby a conversion of the axial movement to a rotation brings the filter element inside of the recess to a position which makes it possible to bring the filter element out of the housing part contrary to the movement originally applied to the filter element.

In another advantageous embodiment, at least one corresponding recess is provided on the filter element. As a reversal of the action, the placement of the recess also on the filter element is possible.

Also according to the invention the recess can have a closing range, an opening range, a translation range, a retaining range and a release range. In this case the recess is configured such that an area is present which, after the filter element has been snapped into the housing part, provides so that the filter element is securely guided in the housing part by the cooperation of the latch element with the corresponding closing range of the recess until the housing is closed.

Embodiments of the invention are represented in the drawings and are explained hereinbelow.

Figure 1A:
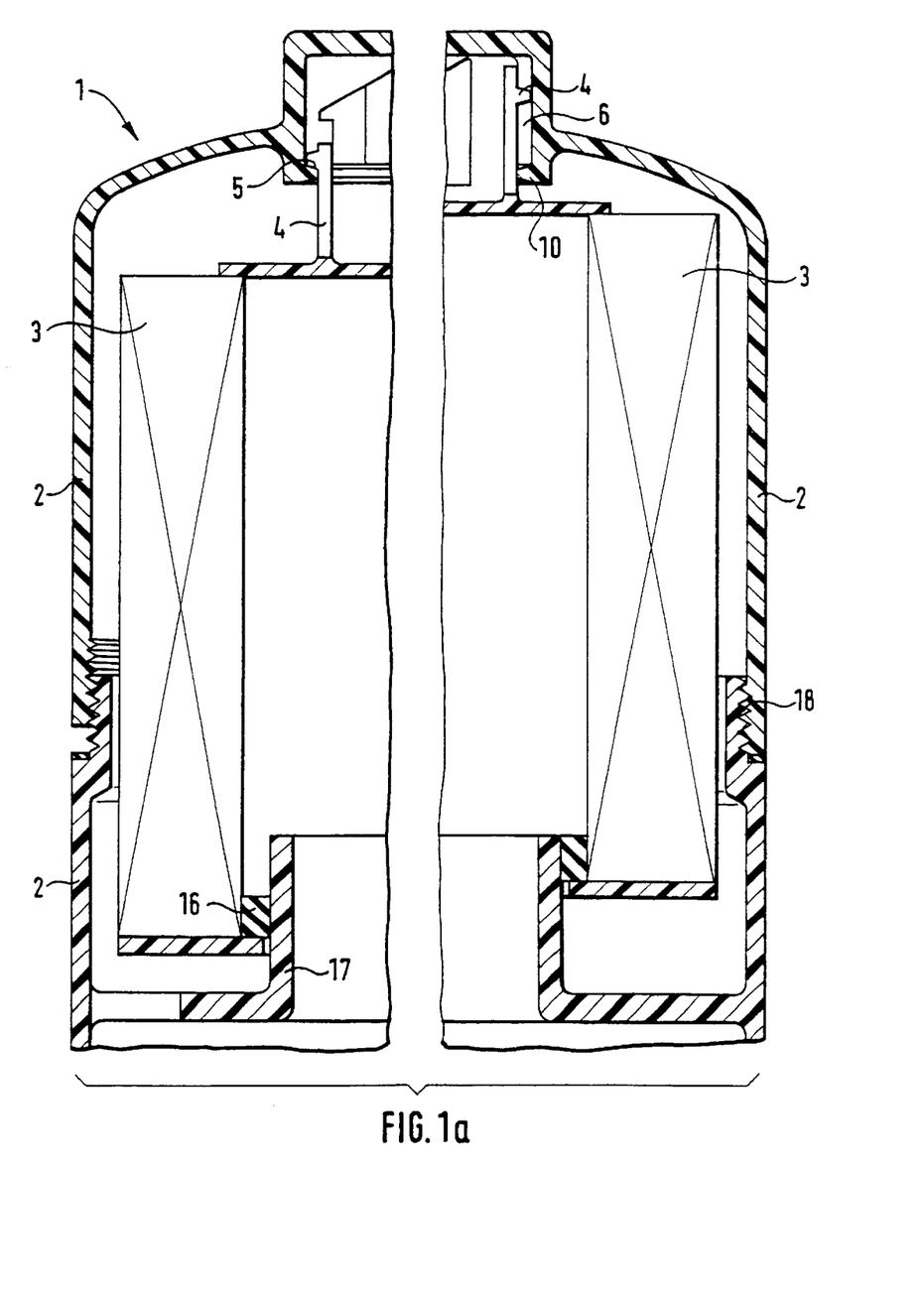
FIG. 1a is section through a filter.

In FIG. 1a a section taken through a filter is shown, which has a housing 1 which in turn consists of two housing parts 2 screwed together. The filter with its housing contains in addition to an inlet and outlet for the fluid, not shown, a hollow cylindrical filter element 3 on the end of which latch means 4 are provided, which serve for a latch connection 5 between filter element 3 and housing part 2, and especially with the cover of the housing. The filter element 3 is shown in two assembly positions in this embodiment, on the left in the pre-assembly position, and on the right in the final assembly position. To produce a reliable latch connection a recess 6 is created in the area of the cover of the housing part 2 of housing 1. This recess 6 has different function areas which are necessary for producing and releasing the latching action. The function areas are made up of closing, opening, translation, retention and release areas.

The filter element 3 is fixed in the receiver 17 by means of a seal 16 and seals the clean fluid side from the raw fluid side. The filter element can be installed in two ways. In one, there is the possibility of placing the filter insert 3 on the receiver 17 and then screwing the filter to the second housing part by means of screw thread 18, the second housing part performing a movement during the screwing operation toward the filter insert 3 situated in the housing. As the housing part moves toward the latch means 4, the latch means 4 must overcome a retention area 10 which, due to the simultaneous rotatory movement of the housing part, brings the result that the latch means in the embodiment using four latch means and corresponding recesses regularly distributed on the circumference snaps into the recess provided for it no later than after a quarter turn of the cover and forms a reliable latched connection 5 in the case of the inverse opening. In another installation variant, the filter insert 3 is to be inserted directly into the cover part of the housing 1 with the recesses 6, so that a latched connection results between the filter element 3 and the housing part 2. The parts joined together can then be inserted with one hand into the lower housing part 2 and on its receiver 17. The two housing parts 2 are then joined together by means of screw thread 18.

Figure 1B:
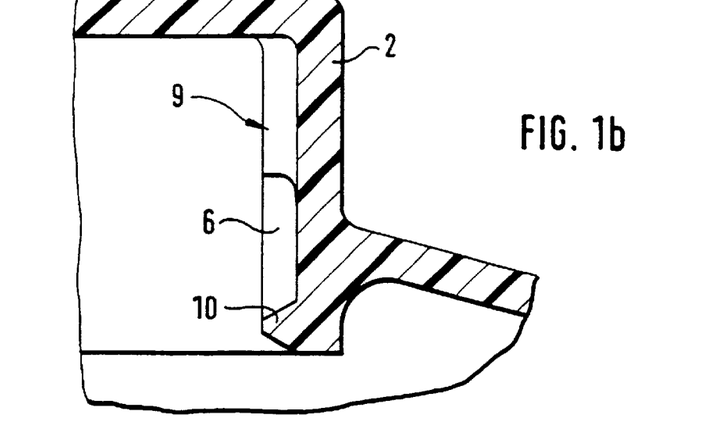
FIG. 1b a section through the housing cover from FIG. 1.

FIG. 1b is a section from FIG. 1a in the area of the cover and housing part 2. Here it can be seen that the recess 6 has different function areas. In this figure the translation area 9 and the retention area 10 are to be seen.

Figure 1C:
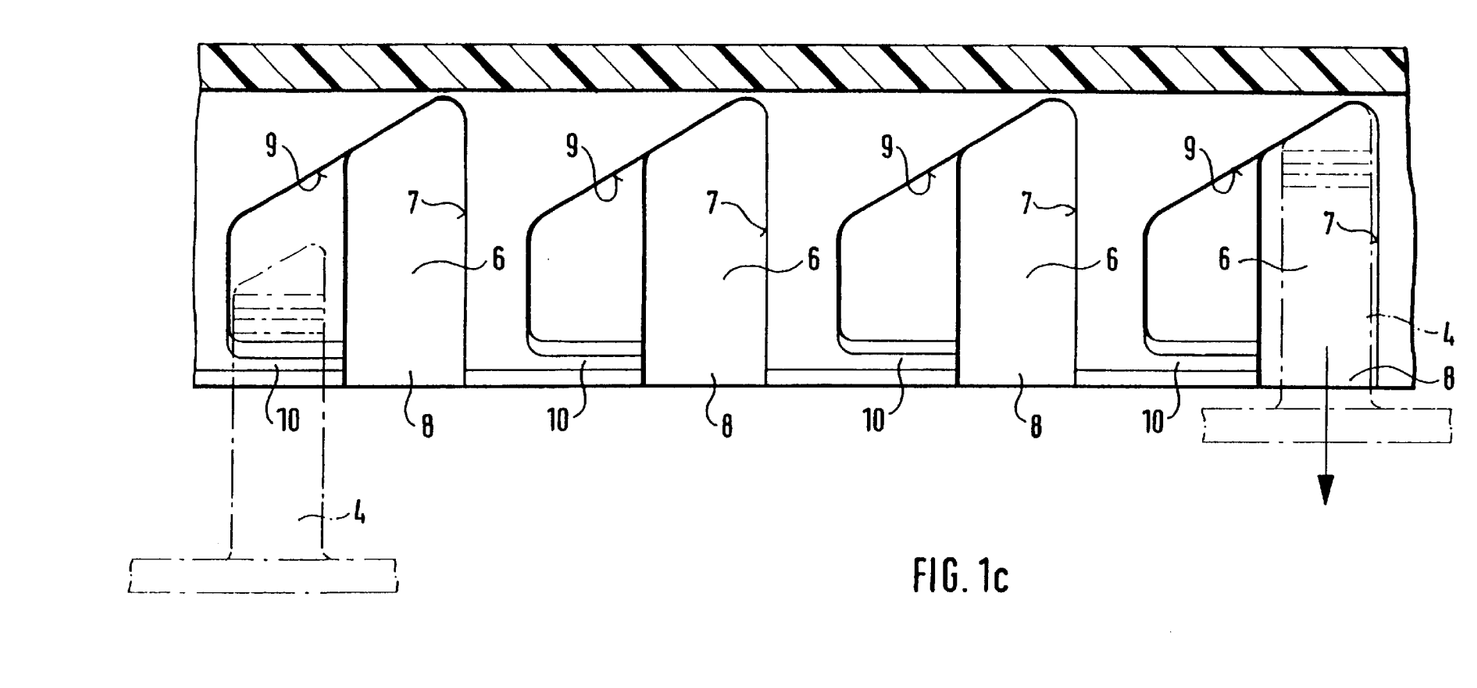
FIG. 1c a development of the recess geometry in the housing cover.

FIG. 1c shows a development of the area of housing 2 that has been represented in FIG. 1b. On the entire circumference of the cylindrical surface can be seen four recesses 6 arranged at regular intervals. Each recess 6 has in its bidimensional development the shape of an impressed numeral 1. Each recess 6 is divided into specific function areas. If the two housing parts are screwed together, the latch means 4 are placed against the closing area 7 of the recess 6. The retention area 10 of the recess 6 has the purpose of leaving the filter insert 3 in the cover half of the housing part when it is removed so that both parts can be taken out with one hand. In order then to separate the filter element 3 from the housing part 2 with the recesses 6, without having to use another hand to help, a translation area 9 is provided in the recess 6, which, with respect to the upper horizontal definition of the housing part, has an angle of 30 degrees or between 30 and 90 degrees. On account of the translation portion 9 provided in the recess 6 it is possible by a vertical movement imparted abruptly along the housing and filter element axis to produce a relative rotation between filter element 3 and the housing part with the recesses 6 and latch means 4 and recesses 6. By this relative movement, caused for example by a vertical striking of the inner edge of the filter element 3, or by a simple turning of the filter element 3 against the housing part 2, the latch means 4 enter into the opening area 8 of the recesses 6. In the opening area 8 of the recesses 6 the retention area 10 is interrupted, so that the filter element together with its latches 4 drops without resistance out of the housing part 2, which contains the recesses 6.

Figure 1D:
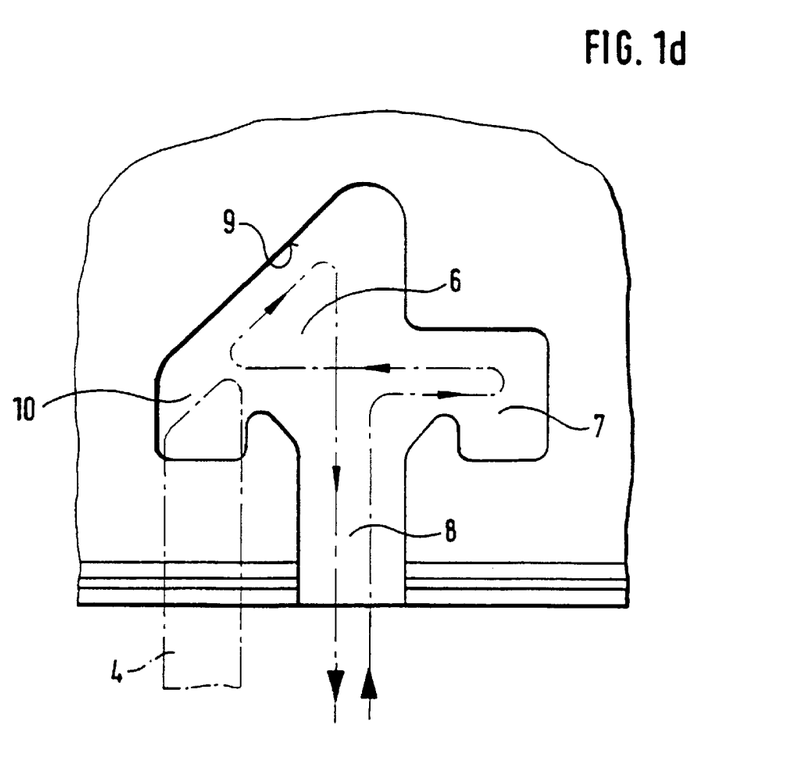
FIG. 1d another variant of a development.

In FIG. 1d there is shown a variant of the recess 6 with a pronounced retention area 10. Also indicated by a broken line are the latch means 4. The recess 6 furthermore has a closing area 7 as well as an opening area 8 and a translation area 9.

Figure 2A:
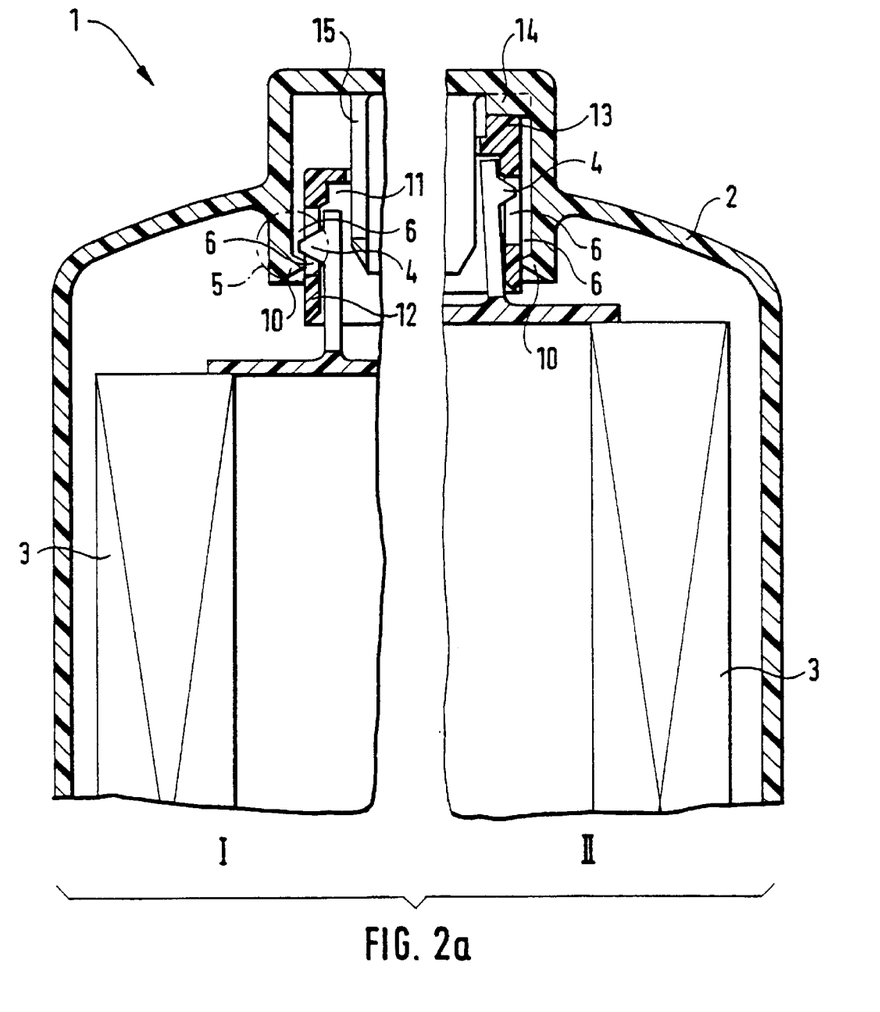
FIG. 2a a section through a filter.

In FIG. 2a are shown two variants. In variant I the cartridge insertion situation is shown, and variant II shows the cartridge removal situation. In the section taken through the filter that is shown, which includes the housing 1 which in turn consists of housing parts 2 and contains a filter element 3, the detailed representation of the joining of the housing parts is omitted, since this has already been made in the figures described above. This figure shows how the latch means 4 enters a releasable junction 5 with the communicating elements, such as the recesses 6, for example, which are disposed in the sleeve 12 and the housing part 2. In the form represented in variant I, after the filter element 3, with sleeve 12 installed, has been inserted into the housing part 2, a snap fastening 5 exists, which retains the filter element 3 securely in the housing part 2, for which the positioning of the latch means 4 shown in this variant with respect to the retention area 10 is responsible. In the embodiment shown in variant II the releasing of the latch junction 5 is disclosed, the latch means 4 being brought to a position in which they become positioned radially inwardly, such that they are held there in a release area 11 which is situated in the sleeve 12 located above and around the latch means 4. To enable the latch means 4 to be driven into this release area 11, the sleeve 12 must be moved, with respect to the longitudinal axis of the filter element 3, along this axis toward the filter element 3, to such an extent that the latch means 4 can snap in at that point. This is accomplished by a axial movement of the housing part 2 along its own longitudinal axis toward the filter element 3, if the distance reducing element 13 on the sleeve 12 and the distance reducing element 14 are axially one above the other on the housing part 2. This positioning of the distance reducing elements 13 and 14 with respect to one another when the housing part 2 is screwed on can be accomplished by the abutment of the distance reducing elements 13 and 14 in the circumferential direction. If now the latch means 4 are engaged in the release area 11 in this manner, the filter element can be taken out of the housing part 2 without resistance past the retention area 10. The spacing and centering pin 15 serves as a pressure element in the installation of the filter element 3.

Figure 2B:
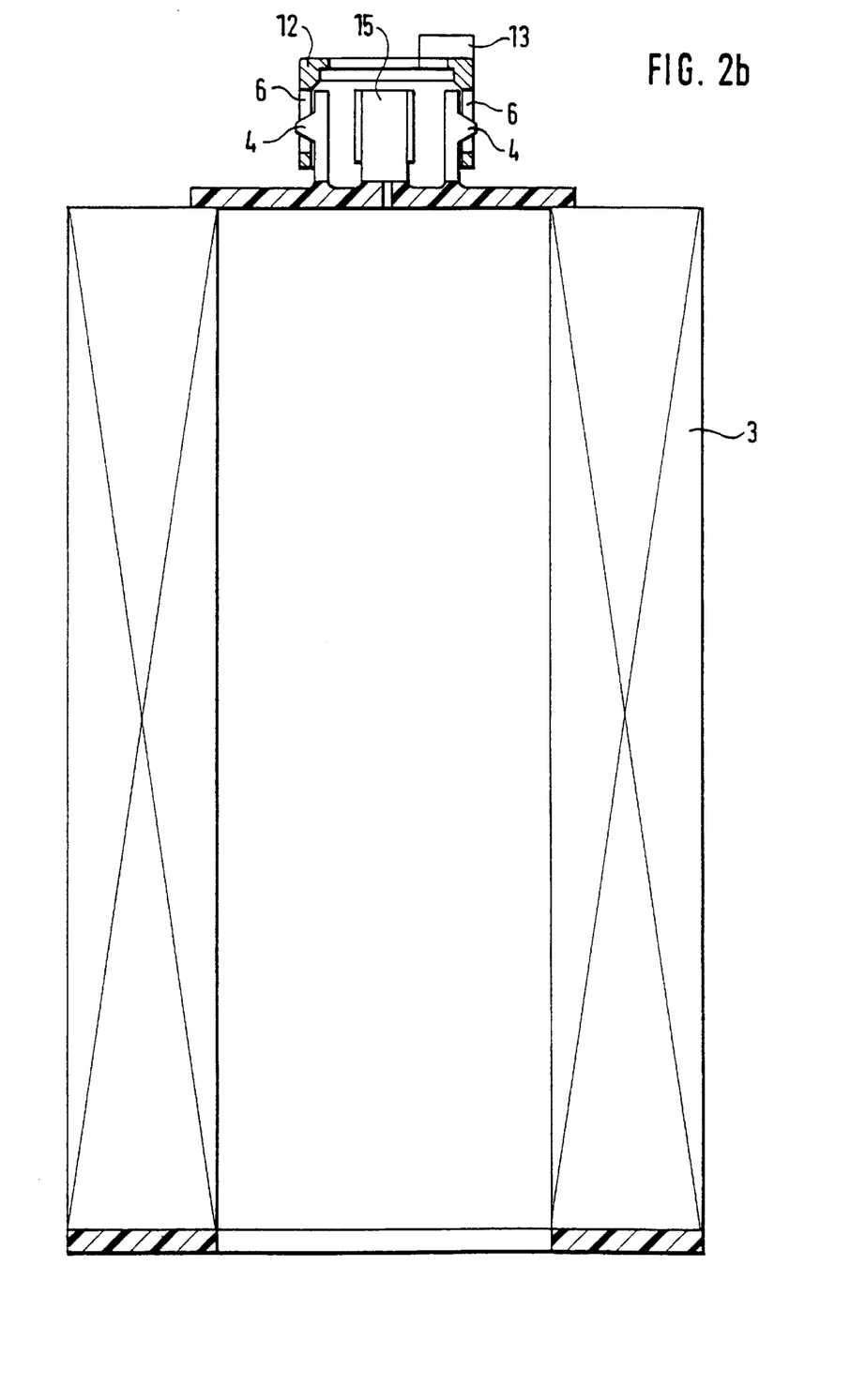
FIG. 2b a section through a filter element.

In FIG. 2b there is shown a filter element 3 which has at its one end latch means 4 acting resiliently in the radial direction. At the same end a spacing and centering pin is provided in the longitudinal direction of the filter element, which represents an alternative reversal of the principle described in FIG. 2a. This is also conceivable with regard to the arrangement of the latch means, since in a reversal of the action, they could also be fastened to the housing part 2. A sleeve 12 is passed around and over the latch means and the latch means can come to rest in its recesses 6, projecting radially outward beyond the imaginary circumferential surface of sleeve 12. A distance reducing element 13 is disposed on the outside of the end of the sleeve and, as described above, serves for releasing the latch connection.

In FIGS. 3a to 3d different variants are represented. In the variants in FIGS. 3a to 3c the cartridge installation is shown, in which a simple, resistance-free removal of the filter element is possible, with a secure latch connection. In the sections shown in FIGS. 3a to 3c, taken through the filter, which includes the housing, which in turn consists of housing parts 2 and contains a filter element 3, there is shown the releasable latch connection 5 produced by the latch means 4 with the communicating elements, such as the recesses 6 which are disposed in the sleeve 12 or the housing part 2. In the form represented in FIG. 3a, after the filter element 3 has been inserted into the housing part 2, a latch connection 5 exists, which holds the filter element 3 securely in the housing part 2, and for which the positioning of the latch means 4 with respect to the retention range 10 is responsible. By the arrangement of the distance reducing elements 13 and 14 such that they are not in direct axial contact in FIGS. 3a to 3c, it is clear that in no position of the housing (FIGS. 3a to 3c) can the latch fastening 5 be released by pulling force on the cartridge, and the spacing and centering pin limits the freedom of movement of the housing.

Figure 3A:
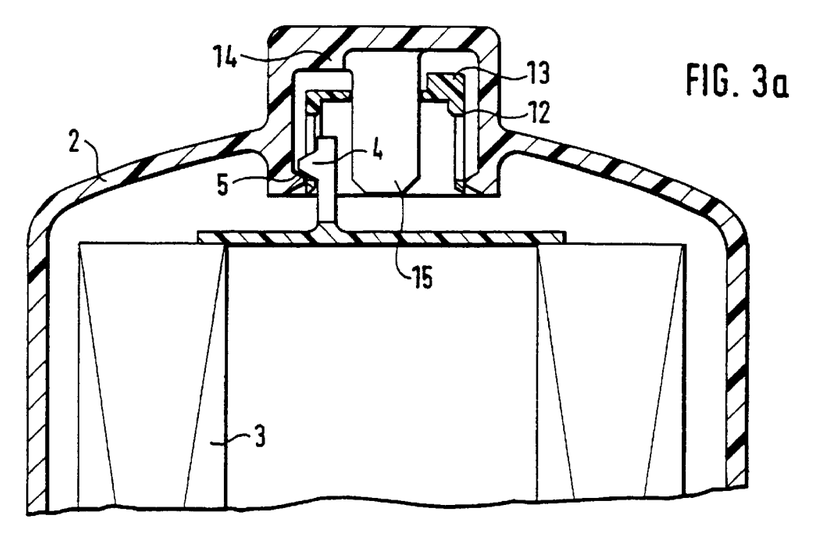
FIG. 3a a section through a filter.
Figure 3B:
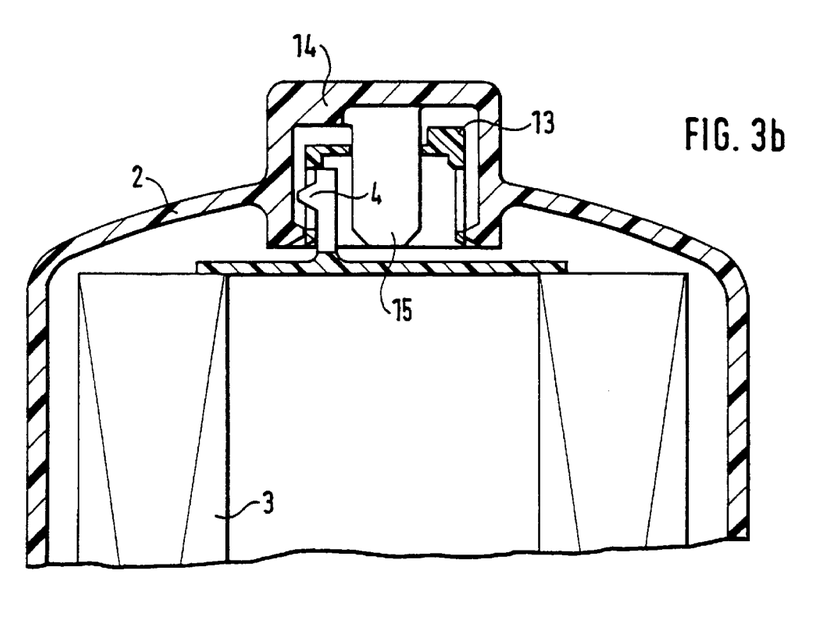
FIG. 3b a section through a filter.
Figure 3C:
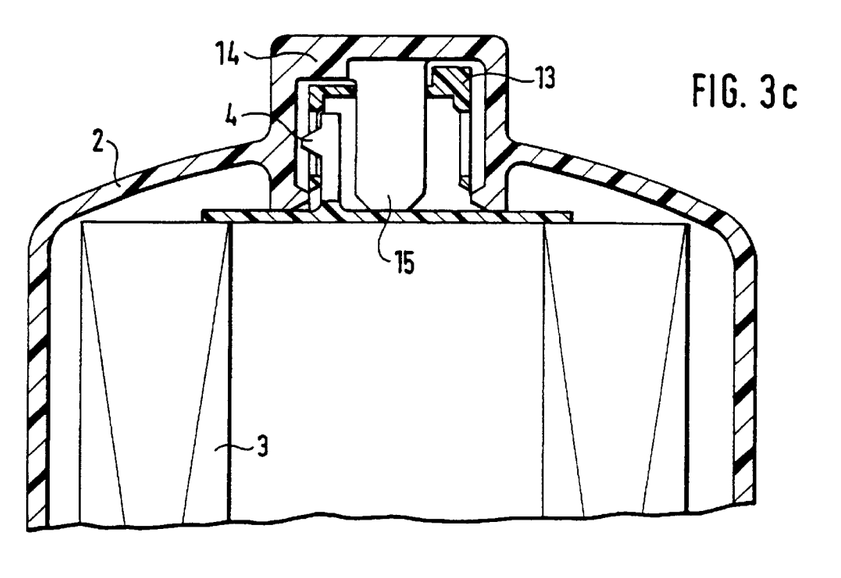
FIG. 3c a section through a filter.
Figure 3D:
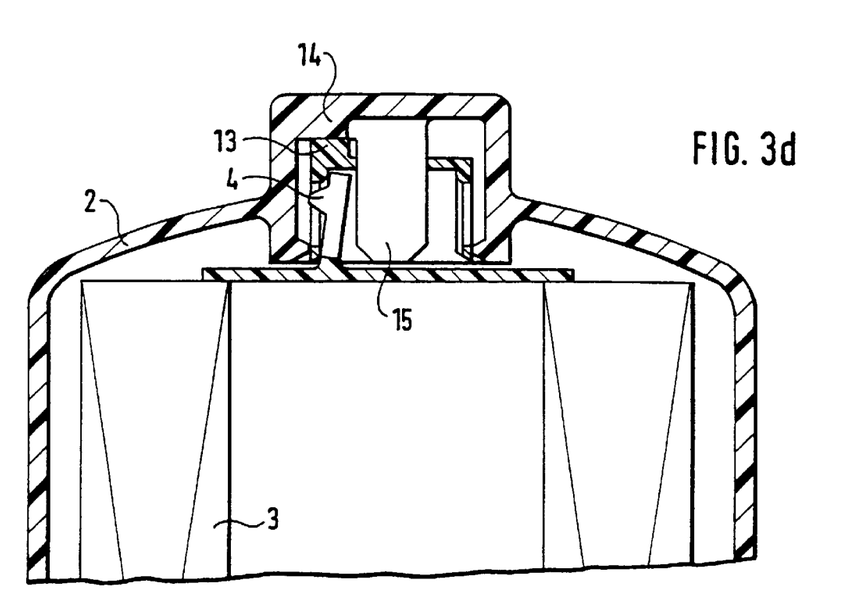
FIG. 3d a section through a filter.

In the drawing shown in FIG. 3d, the release of the latch fastening is disclosed, while the latch means 4 are brought into a position wherein they are positioned radially inward such that they latch in a release area 11 which is disposed in the sleeve 12 around the latch means 4. So that the latch means 4 will be able to arrive in this release area 11 the sleeve 12 must be moved with respect to the longitudinal axis of the filter element, along this longitudinal axis to the filter element 3, to such an extent that the latch means 4 can snap into it. This is accomplished by an axial movement of the housing part 2 along its own longitudinal axis to the filter element 3 when the distance reducing element 13 on the sleeve 12 and the distance reducing element 14 on the housing part 2 are axially one over the other. This positioning of the distance reducing elements 13 and 14 with respect to one another when the housing part 2 is screwed on can be accomplished by an abutment of the distance reducing elements 13 and 14 in the circumferential direction. If now the latch means are caught in the release area 11 in this manner, the filter element can be removed from the housing part 2 without resistance past the retention area 11. The function of the spacing and centering pin as a pressure element during assembly can also be provided by the hooked edges of the retention area 10 and the latch means 4.

What is claimed is:

1. A filter assembly comprising:

a housing having a first part and a second part;

means for rotatably connecting and disconnecting the first part to the second part;

a filter element configured to fit in said housing;

a latch connected to one end of said filter element for attaching said filter element to said first housing part;

said first housing part including a recessed portion for receiving said latch wherein said recessed portion has a closing area which accommodates the latch upon rotatably connecting the first and second parts of the housing and wherein the recessed portion also including a retention area for retaining said latch upon rotatable disconnecting of said first and second parts of the housing and after the separation of said first and second parts of the housing, said recessed portion further having a translation area having an inclined surface for separation of said latch from said retention area and said recessed portion having an opening area for providing a resistance free separation of said latch from said recessed portion in order to separate said filter element from said first part of said housing.

2. The filter assembly according to claim 1, wherein said closing area of said recessed portion further includes a connection device for retaining said latch when said first and second parts of said housing are not completely connected.

3. Filter assembly according to claim 1, wherein said means for a rotatably connecting the first and second parts of said housing include a screw thread.

4. A filter assembly comprising:

a first housing having a first and second part, wherein said first part includes a recess defining area;

a filter element configured to fit in said housing;

a latch means connected to said filter element to provide a releasable connection between said filter element and the retention area of the recess of said first housing part;

a sleeve disposed within said recess and surrounding said latch means wherein said sleeve and said recess cooperate to permit a connection between said latch means and said retention area in a first position, said sleeve and said recess including distance reducing elements, said sleeve defining a releasing area for permitting release of the connection between the latch means and said retention area when said distance reducing elements are positioned in an abutting relationship to move said sleeve to a second position in order to provide resistence-free separation of said filter element and said housing.

* * * * *